Patented Apr. 21, 1942

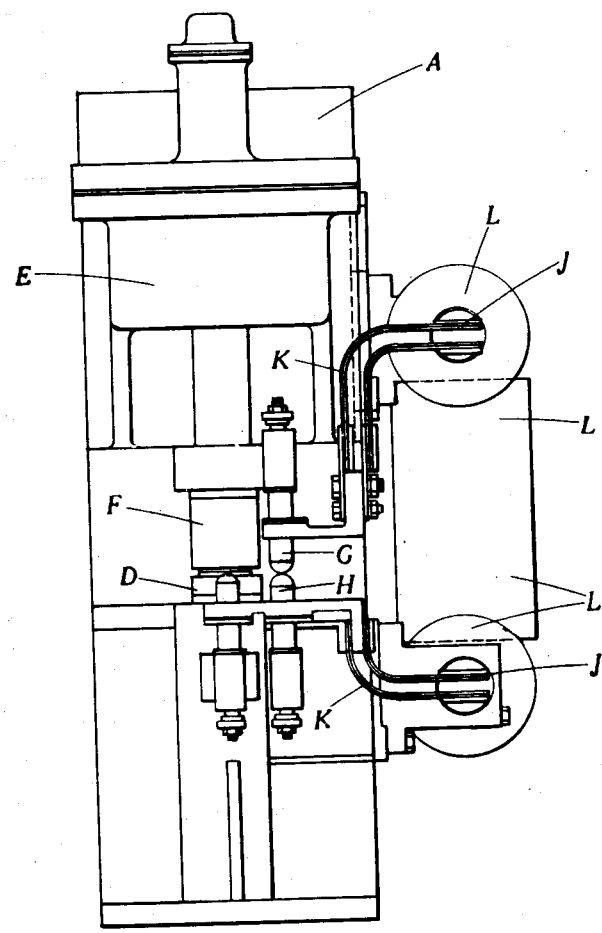

2,280,369

UNITED STATES PATENT OFFICE 2,280,369

RESISTANCE WELDING MACHINE

John Wallis Bayles, Sunderland, England, assignor to A. Reyrolle & Company Limited, Hebburn-on-Tyne, England, a company of Great Britain Application March 31, 1941, Serial No. 386,179
In Great Britain April 11, 1940

2 Claims. (Cl. 219—4)

This invention relates to resistance welding machines and more particularly to such machines of high power and large capacity in which the circuit of the welding current must pass in a comparatively large loop round the work from one electrode to the other. Owing to the size of this loop, within which a part of the work is normally situated, and the magnitude of the current involved, of the order of 20,000 to 30,000 amperes, the reactance of the welding current circuit presents a serious problem and in practice has in the past tended to set a limit to the size of work which could be satisfactorily handled. Owing to this reactance the output of the transformer is reduced, and even if a larger transformer is used the maximum kva. demand is greater than is desirable and the power factor is particularly unfavourable. Moreover since when welding magnetic material the reactance varies with work of different dimensions and with the position of the work in the loop control of the welding current is rendered more difficult.

An object of the present invention is to provide means for reducing these reactance effects.

Customarily the transformer by which the welding current is produced, and of which the secondary winding is included in the welding current circuit, is situated at a point in the circuit remote from the electrodes, for example in the support from which project the arms carrying the electrodes.

According to the present invention the primary winding and the core of the transformer are each divided into a plurality of corresponding sections distributed along a conductor which constitutes the greater part of the welding current circuit and conveniently passes through each transformer core as a straight-through secondary. If the circuit between the electrodes is generally U-shaped there is preferably at least one section of core and primary winding on each side limb of the U, for example in one specific arrangement described hereafter there are four on one limb, four on the other limb, and two along the base of the U.

Preferably the welding circuit is offset laterally from the arms by which the electrodes are carried, that is to say it lies generally in a plane parallel to that of the arms.

The invention may be carried into effect in various ways but one specific construction will be described by way of example with reference to the accompanying drawings, in which—

Figure 2 is an end elevation of a resistance welding machine embodying the invention.

Figure 1:
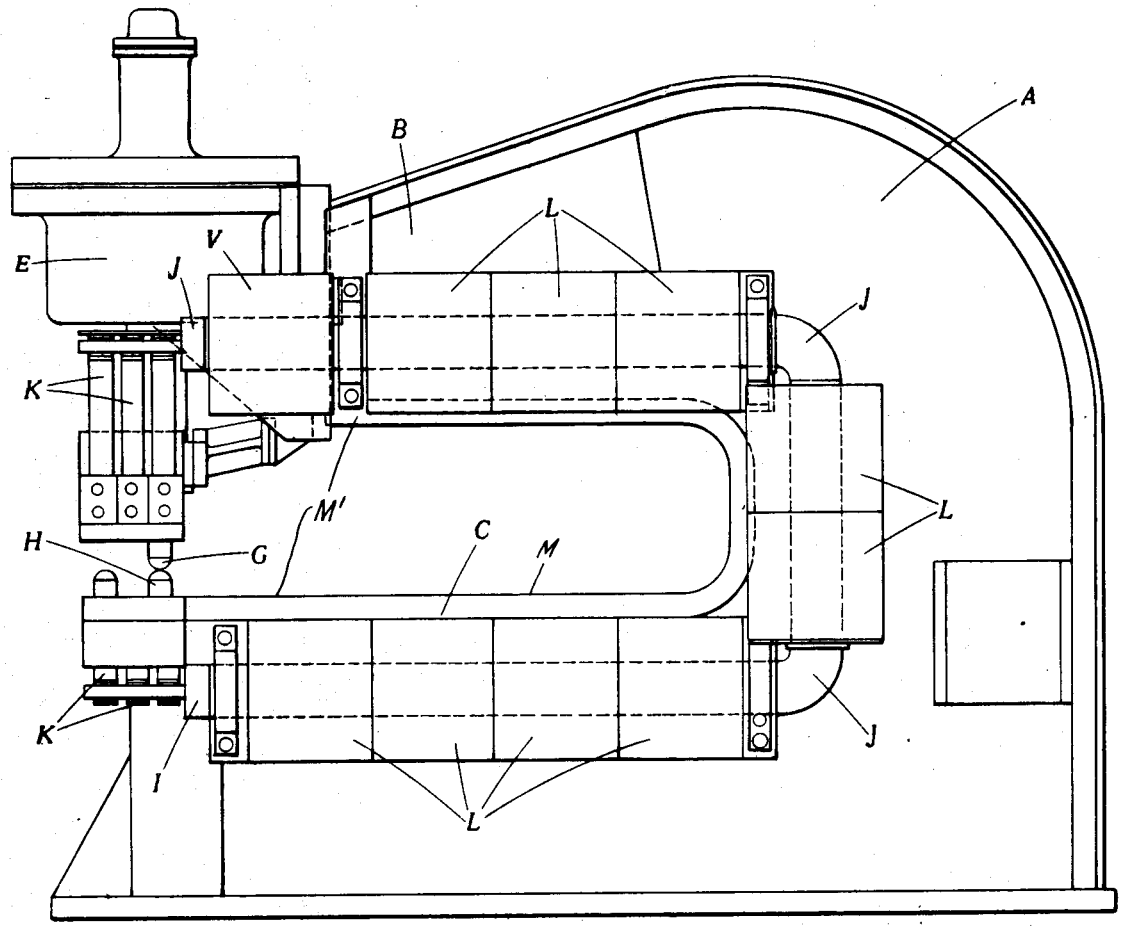
Figure 1 is a side elevation.

In order to minimize trouble due to indentation of the softened work by the pressure of the electrodes the machine is provided with clamping members separate from the electrodes arranged in accordance with British Patent No. 424,627.

Thus the main frame of the machine A has a pair of arms B and C extending above and below the space for the work. At their forward ends the lower arm carries the lower clamping member D whilst the upper arm carries a hydraulic cylinder E the ram of which carries the upper clamping member F. The clamping members are insulated from the arms to avoid the formation of a closed circuit through which current could circulate through the frame.

The electrodes G and H are offset laterally from the clamping members, that is to say they lie in a plane parallel to the central plane of the arms and clamping members. They are carried respectively by the two clamping members but are insulated from them and adjustably or resiliently connected to them as for instance in accordance with British Patent No. 453,009 so that their pressure on the work can be proportioned appropriately to that of the clamping members.

The welding circuit, apart from the electrodes and their immediate connections, is constituted by a single water-cooled secondary conductor J bent to the form of a U and supported on the side of the arms B and C in a plane spaced considerably further than the electrodes from the central plane of the arms. The forward ends of this conductor are connected respectively to the two electrodes by means of flexible leads K serving to permit the movement of the electrodes.

Along, and each encircling, the secondary conductor are a number of sections of core L each having a section of primary winding wound on it. For example there may be four sections of core along the top limb, four along the bottom limb, and two along the generally vertical part constituting the base of the U. These sections are mounted along the secondary conductor as close as possible to each other so that they cover the greater part of the conductor, and in order to avoid leakage within the sections they are made a close fit on the secondary conductor. As far as possible the proximity of magnetic materials to the transformer and conducting parts is avoided and the flexible leads K are reduced to the minimum length required for the movement of the electrodes, since these cannot be encircled by the sections of the transformer.

Use may also be made of short-circuited loops or turns of conducting material mounted in the frame of the machine with the object of excluding as far as possible leakage flux from the space occupied by the work. For example two U-shaped conductors M one on each side of the frame may be connected together at their ends M¹ to form a single short-circuited loop.

Switching arrangements may be provided for connecting the sections of primary windings to a source of supply in various ways to vary the output of the machine. For example if they are all normally connected in parallel one or more of them may be cut out of circuit to reduce the total secondary open circuit voltage and the corresponding available welding current. The section or sections cut out of circuit are preferably short-circuited in order to avoid a high induced voltage in the primary winding and an increase in reactance which would otherwise occur. In another arrangement tappings may be provided on the transformer primaries.

In the arrangement described it will be appreciated that the length of the secondary conductor is reduced to the minimum necessary for it to reach from one electrode to the other round the space for the work and the additional reactance of a non-distributed transformer and connections is avoided. Moreover the distribution of the sections of core along the secondary conductor tends to minimise leakage reactance, which would also tend to reduce the output obtained from a given kva, and to reduce variations of welding current due to the magnetic effect of the work.

What I claim as my invention and desire to secure by Letters Patent is:

1. A resistance welding machine comprising a pair of arms extending on opposite sides of the space for the work, welding electrodes carried by said arms near the ends of the latter, and a transformer separate from and mounted at the side of the arms and comprising a generally U-shaped conductor constituting a straight-through secondary connected at its ends to the electrodes for supplying current to them, and a plurality of sections of core and primary winding distributed along said secondary conductor.

2. A resistance welding machine comprising a pair of arms extending on opposite sides of the space for the work, welding electrodes carried by said arms near the ends of the latter, and a transformer separate from and mounted at the side of the arms and comprising a generally U-shaped conductor constituting a straight-through secondary connected at its ends to the electrodes for supplying current to them, a plurality of sections of core and primary winding distributed along said secondary conductor, and at least one short-circuited loop of conducting material mounted along the inner surfaces of said arms.

JOHN WALLIS BAYLES.